United States Patent
Cho et al.

(10) Patent No.: US 10,509,918 B1
(45) Date of Patent: Dec. 17, 2019

(54) ONE-TIME OBFUSCATION FOR POLYNOMIAL-SIZE ORDERED BINARY DECISION DIAGRAMS (POBDDS)

(71) Applicant: HRL Laboratories, LLC, Malibu, CA (US)

(72) Inventors: Chongwon Cho, Los Angeles, CA (US); Karim El Defrawy, Santa Monica, CA (US)

(73) Assignee: HRL Laboratories, LLC, Malibu, CA (US)

( * ) Notice: Subject to any disclaimer, the term of this patent is extended or adjusted under 35 U.S.C. 154(b) by 419 days.

(21) Appl. No.: 15/269,367

(22) Filed: Sep. 19, 2016

Related U.S. Application Data

(60) Provisional application No. 62/220,877, filed on Sep. 18, 2015.

(51) Int. Cl.
| | | |
|---|---|---|
| *G06F 21/12* | (2013.01) | |
| *G06F 21/62* | (2013.01) | |
| *H04L 9/32* | (2006.01) | |

(52) U.S. Cl.
CPC ........ *G06F 21/6227* (2013.01); *H04L 9/3236* (2013.01); *H04L 2209/16* (2013.01)

(58) Field of Classification Search
CPC ........ G06F 21/12; G06F 21/125; G06F 21/14; G06F 21/6227; H04L 9/32; H04L 9/3236; H04L 2209/04; H04L 2209/046; H04L 2209/16
See application file for complete search history.

(56) References Cited

U.S. PATENT DOCUMENTS

| | | | | |
|---|---|---|---|---|
| 6,668,325 | B1* | 12/2003 | Collberg ................. | G06F 21/14 713/194 |
| 8,903,083 | B2* | 12/2014 | Gentry .................... | H04L 9/008 380/28 |
| 2004/0078581 | A1* | 4/2004 | Dublish .................. | G06F 21/10 713/189 |
| 2004/0093541 | A1* | 5/2004 | Jain ........................ | G06F 17/504 714/724 |
| 2005/0138474 | A1* | 6/2005 | Jain .................. | G01R 31/31703 714/30 |
| 2005/0198404 | A1* | 9/2005 | Kawakami .......... | G06F 12/1408 710/1 |

(Continued)

OTHER PUBLICATIONS

Varia, Mayank, "Studies in Program Obfuscation" [Online], Sep. 2010 [Retrieved Nov. 7, 2018], Retrieved from: < https://dspace.mit.edu/bitstream/handle/1721.1/64489/727175818-MIT.pdf?sequence=2 > (Year: 2010).*

(Continued)

*Primary Examiner* — Eric W Shepperd
(74) *Attorney, Agent, or Firm* — Tope-McKay & Associates

(57) ABSTRACT

Described is a system for protecting sensitive information that is hardcoded in polynomial-size ordered binary decision diagram (POBDD) form. A software executable represented as a POBDD having sensitive information embedded therein is obfuscated into an obfuscated POBDD. An input query on the obfuscated POBDD is evaluated, and the sensitive information is revealed only if the input query is a correct input. Thus, an adversary is prevented from extracting the sensitive information embedded in the POBDD.

20 Claims, 4 Drawing Sheets

POBDD G'

POBDD G

(56) References Cited

U.S. PATENT DOCUMENTS

| | | | | |
|---|---|---|---|---|
| 2006/0140401 | A1* | 6/2006 | Johnson | G06F 21/14 380/44 |
| 2006/0173666 | A1* | 8/2006 | Jain | G06F 17/504 703/14 |
| 2008/0059624 | A1* | 3/2008 | Groz | G06Q 40/04 709/223 |
| 2008/0243907 | A1* | 10/2008 | Stergiou | G06F 16/31 |
| 2009/0307500 | A1* | 12/2009 | Sato | G06F 21/14 713/190 |
| 2013/0290356 | A1* | 10/2013 | Yang | G06F 17/30985 707/755 |
| 2016/0006541 | A1* | 1/2016 | Eftekhari | G11B 20/00 714/776 |

OTHER PUBLICATIONS

Narayanan et al. "Obfuscating Straight Line Arithmetic Programs" [Online], Nov. 9, 2009 [Retrieved: Nov. 7, 2018], ACM, Retrieved from: < http://delivery.acm.org/10.1145/1660000/1655057/p47-narayanan.pdf > (Year: 2009).*

Thomas H. Cormen, Charles E. Leiserson, Ronald L. Rivest, and Clifford Stein. Introduction to Algorithms (2nd ed.). 2001. McGraw-Hill Higher Education. Chapter 22.2 pp. 531-539.

Boaz Barak, Oded Goldreich, Russell Impagliazzo, Steven Rudich, Amit Sahai, Salil P. Vadhan, and Ke Yang. On the (im)possibility of obfuscating programs. In Joe, Kilian, editor, Advances in Cryptology—Crypto 2001, vol. 2139 of Lecture Notes in Computer Science, pp. 1-18, Santa Barbara, CA, USA, Aug. 19-23, 2001. Springer.

David Barrington. Bounded-width polynomial-size branching programs recognize exactly those languages in NC1. In Proceedings of the eighteenth annual ACM symposium on Theory of computing (STOC '86). ACM, New York, NY, USA, pp. 1-5. 1986.

Hoeteck Wee. On obfuscating point functions. In Harold N. Gabow and Ronald Fagin, editors, 37th Annual ACM Symposium on Theory of Computing, pp. 523-532, Baltimore, Maryland, USA, May 22-24, 2005. ACM press.

Benjamin Lynn, Manoj Prabhakaran, and Amit Sahai. Positive results and techniques for obfuscation, Advances in Cryptology—Eurocrypt 2004, vol. 3027 of Lecture Notes in Computer Science, pp. 20-39, Interlaken, Switzerland, May 2-6, 2004. Springer.

Shafi Goldwasser and Guy N. Rothblum. On best-possible obfuscation. In Salil P. Vadhan, editor, TCC 2007: 4th Theory of Cryptography Conference, vol. 4392 of Lecture Notes in Computer Science, pp. 194-213, Amsterdam, The Netherlands, Feb. 21-24, 2007. Springer.

Sanjam Garg, Craig Gentry, Shai Halevi, Mariana Raykova, Amit Sahai, and Brent Waters. Candidate indistinguishability obfuscation and functional encryption for all circuits. In 54th Annual Symposium on Foundations of Computer Science, pp. 40-49, Berkeley, CA, USA, Oct. 26-29, 2013. IEEE Computer Society Press.

Robert E. Simpson, "The Exclusive OR (XOR) Gate." §12.5.6 in Introductory Electronics for Scientists and Engineers, 2nd ed. Boston, MA: Allyn and Bacon, pp. 550-554, 1987.

Andrew Chi-Chih Yao, "How to generate and exchange secrets," Foundations of Computer Science, 1986., 27th Annual Symposium on , vol., No., pp. 162,167, Oct. 27-29, 1986.

* cited by examiner

ONE-TIME OBFUSCATION FOR POLYNOMIAL-SIZE ORDERED BINARY DECISION DIAGRAMS (POBDDS)

CROSS-REFERENCE TO RELATED APPLICATIONS

This is a Non-Provisional application of U.S. Provisional Application No. 62/220,877, filed in the United States on Sep. 18, 2015, entitled, "One-Time Obfuscation for POBDDs," which is incorporated herein by reference in its entirety.

BACKGROUND OF INVENTION

(1) Field of Invention

The present invention relates to a system for obfuscating any polynomial-size ordered binary decision diagram (POBDD) to protect sensitive information and, more particularly, to a system for obfuscating any POBDD to protect sensitive information which is hardcoded in POBDD form in the Random Oracle Model (ROM).

(2) Description of Related Art

In software development, obfuscation is the act of creating obfuscated code (i.e. source or machine code that is difficult for humans to understand). Programmers may deliberately obfuscate code to conceal its purpose or its logic, in order to prevent tampering, deter reverse engineering, or as a puzzle or recreational challenge for someone reading the source code. Programs known as obfuscators transform readable code into obfuscated code using various techniques. The following are prior art in obfuscation algorithms.

The work described in Literature Reference No. 1 (see the List of Incorporated Literature References as provided below) considers the notion of cryptographic obfuscation. This work provides a strong impossibility result of the strong notion of cryptographic obfuscation for general functions in the plain model (i.e., no random oracle model (ROM)).

In Literature Reference No. 4, the authors provided the first strong point obfuscation from strong pseudorandom functions with super-polynomial hardness in the plain model. However, the obfuscation is achieved only for a class of point functions.

Further, the work disclosed in Literature Reference No. 5 describes how to obfuscate some classes of functions in the ROM and achieve the obfuscations in a composable way. Even though the work considers the obfuscation for the class of graph access functions, it lacks the explicit construction of how to obfuscate the class of polynomial-size ordered binary decision diagrams (POBDDs).

The authors of Literature Reference No. 6 considered the obfuscation of POBDDs in the weaker notion of obfuscation, so called Indistinguishability Obfuscation. However, the indistinguishability obfuscation does not guarantee the protection of sensitive information of the circuit.

Additionally, Literature Reference No. 7 provides the first general purpose obfuscation for all polynomial-size circuits in the notion of indistinguishable obfuscation, which satisfies a weaker form of security under the cryptographic multi-linear encoding. However, due to the underlying building block, the obfuscation scheme is impractical.

Finally, Yao garbled circuit approach (see Literature Reference No. 9), and variations thereof, require interaction between the developer of the program/circuit to be executed and the one running it. In the aforementioned approach, the first party garbles a circuit/program by generating encryptions of the gates and preparing tables for each one. The parties then interact so that the second party extracts the correct keys and executes the circuit gate by gate by extracting the appropriate keys corresponding to its inputs without either of the parties learning extra information.

Thus, a continuing need exists for a system that provides an explicit construction of cryptographic obfuscation for POBDDs with strong information protection for input POBDDs.

SUMMARY OF INVENTION

The present invention relates to a system for obfuscating any polynomial-size ordered binary decision diagram (POBDD) to protect sensitive information and, more particularly, to a system for obfuscating any POBDD to protect sensitive information which is hardcoded in POBDD form in the Random Oracle Model (ROM). The system comprises one or more processors and a memory having instructions such that when the instructions are executed, the one or more processors perform multiple operations. The system performs cryptographic obfuscation of a software executable represented as a polynomial-size ordered binary decision diagram (POBDD), having sensitive information embedded therein, into an obfuscated POBDD via an obfuscation process that hides a mapping between an input query and a corresponding output decision bit.

In another aspect, the system evaluates the input query on the obfuscated POBDD via an evaluation process, and reveals the sensitive information embedded in the POBDD only if the input query is a correct input, wherein the input query is a sequence of secret strings, having a length, corresponding to an input x, and wherein the output of the evaluation process is the output decision bit providing an instruction regarding a next operation to perform.

In another aspect, the system generates an output message string in response to a first input query by a party, parses the message string, wherein a result from parsing the message string allows the party to correctly compose a new input query and evaluate a next node in the obfuscated POBDD, and executes the evaluation process until an output message string indicates a terminal node in the obfuscated POBDD or an output decision bit.

In another aspect, the system restricts access to sensitive information when an incorrect input query is received while permitting adversaries to determine the length of the sequence of secret strings.

In another aspect, the obfuscation process takes as input a set of ordered variables, a set of edges, and a set of nodes describing the POBDD, and outputs the obfuscated POBDD.

In another aspect, for each edge leaving a root node to a child node, the system computes a cryptographic hash function, resulting in a variable identifier and a unique node identifier of the root node and random strings for every child node.

In another aspect, the obfuscated POBDD comprises a plurality of nodes and edges, and wherein each node and edge in the obfuscated POBDD is associated with a secret value related to an input bit of the input query via a random oracle model, such that to traverse the nodes in the obfuscated POBDD, the secret values associated with the nodes must be obtained.

In another aspect, the obfuscated POBDD can be correctly evaluated only once.

As can be appreciated by one skilled in the art, in another aspect, the present invention also comprises a method for causing a processor to perform the operations described herein.

Finally, in another aspect, the present invention also comprises a computer program product comprising computer-readable instructions stored on a non-transitory computer-readable medium that are executable by a computer having a processor for causing the processor to perform the operations described herein.

BRIEF DESCRIPTION OF THE DRAWINGS

The objects, features and advantages of the present invention will be apparent from the following detailed descriptions of the various aspects of the invention in conjunction with reference to the following drawings, where.

DETAILED DESCRIPTION

Figure 1:
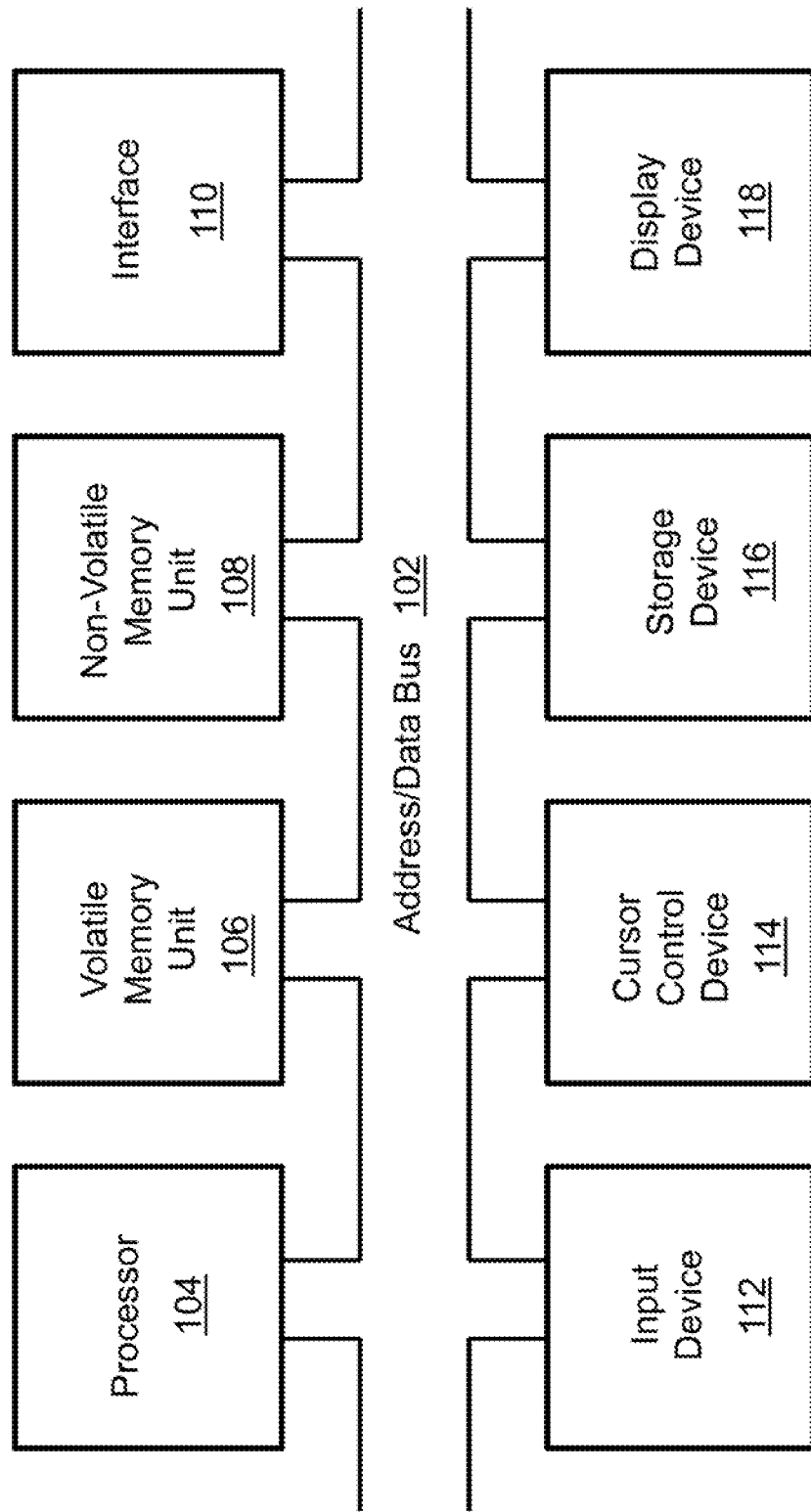
FIG. 1 is a block diagram depicting the components of a system for obfuscating polynomial-size ordered binary decision diagrams (POBDDs) according to embodiments of the present disclosure.

The present invention is a system for obfuscating any polynomial-size ordered binary decision diagram (POBDD) to protect sensitive information and, more particularly, to a system for obfuscating any POBDD to protect sensitive information which is hardcoded in POBDD form in the Random Oracle Model (ROM).

The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of aspects. Thus, the present invention is not intended to be limited to the aspects presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Before describing the invention in detail, first a list of cited references is provided. Next, a description of the various principal aspects of the present invention is provided. Finally, specific details of various embodiment of the present invention are provided to give an understanding of the specific aspects.

(1) LIST OF CITED LITERATURE REFERENCES

The following references are cited throughout this application. For clarity and convenience, the references are listed herein as a central resource for the reader. The following references are hereby incorporated by reference as though fully set forth herein. The references are cited in the application by referring to the corresponding literature reference number.

1. Boaz Barak, Oded Goldreich, Russell Impagliazzo, Steven Rudich, Amit Sahai, Salil P. Vadhan, and Ke Yang. On the (im)possibility of obfuscating programs. In Joe, Kilian, editor, Advances in Cryptology—Crypto 2001, volume 2139 of Lecture Notes in Computer Science, pages 1-18, Santa Barbara, Calif., USA, Aug. 19-23, 2001. Springer.
2. David Barrington. Bounded-width polynomial-size branching programs recognize exactly those languages in NC1. In Proceedings of the eighteenth annual ACM symposium on Theory of computing (STOC '86). ACM, New York, N.Y., USA, 1-5. 1986.
3. Thomas H. Cormen, Charles E. Leiserson, Ronald L. Rivest, and Clifford Stein. Introduction to Algorithms (2nd ed.). 2001. McGraw-Hill Higher Education.
4. Hoeteck Wee. On obfuscating point functions. In Harold N. Gabow and Ronald Fagin, editors, $37^{th}$ Annual ACM Symposium on Theory of Computing, pages 523-532, Baltimore, Md., USA, May 22-24, 2005. ACM press.
5. Benjamin Lynn, Manoj Prabhakaran, and Amit Sahai. Positive results and techniques for obfuscation, Advances in Cryptology—Eurocrypt 2004, volume 3027 of Lecture Notes in Computer Science, pages 20-39, Interlaken, Switzerland, May 2-6, 2004. Springer.
6. Shaft Goldwasser and Guy N. Rothblum. On best-possible obfuscation. In Salil P. Vadhan, editor, TCC 2007: $4^{th}$ Theory of Cryptography Conference, volume 4392 of Lecture Notes in Computer Science, pages 194-213, Amsterdam, The Netherlands, Feb. 21-24, 2007. Springer.
7. Sanjam Garg, Craig Gentry, Shai Halevi, Mariana Raykova, Amit Sahai, and Brent Waters. Candidate indistinguishability obfuscation and functional encryption for all circuits. In $54^{th}$ Annual Symposium on Foundations of Computer Science, pages 40-49, Berkeley, Calif., USA, Oct. 26-29, 2013. IEEE Computer Society Press.
8. Robert E. Simpson, "The Exclusive OR (XOR) Gate." § 12.5.6 in Introductory Electronics for Scientists and Engineers, 2nd ed. Boston, Mass.: Allyn and Bacon, pp. 550-554, 1987

9. Andrew Chi-Chih Yao, "How to generate and exchange secrets," Foundations of Computer Science, 1986, 27th Annual Symposium on, vol., no., pp. 162, 167, 27-29 Oct. 1986.

(2) PRINCIPAL ASPECTS

Various embodiments of the invention include three "principal" aspects. The first is a system for obfuscating polynomial-size ordered binary decision diagrams (POBDDs). The system is typically in the form of a computer system operating software or in the form of a "hard-coded" instruction set. This system may be incorporated into a wide variety of devices that provide different functionalities. The second principal aspect is a method, typically in the form of software, operated using a data processing system (computer). The third principal aspect is a computer program product. The computer program product generally represents computer-readable instructions stored on a non-transitory computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read-only memory (ROM), and flash-type memories. These aspects will be described in more detail below.

A block diagram depicting an example of a system (i.e., computer system 100) of the present invention is provided in FIG. 1. The computer system 100 is configured to perform calculations, processes, operations, and/or functions associated with a program or algorithm. In one aspect, certain processes and steps discussed herein are realized as a series of instructions (e.g., software program) that reside within computer readable memory units and are executed by one or more processors of the computer system 100. When executed, the instructions cause the computer system 100 to perform specific actions and exhibit specific behavior, such as described herein.

The computer system 100 may include an address/data bus 102 that is configured to communicate information. Additionally, one or more data processing units, such as a processor 104 (or processors), are coupled with the address/data bus 102. The processor 104 is configured to process information and instructions. In an aspect, the processor 104 is a microprocessor. Alternatively, the processor 104 may be a different type of processor such as a parallel processor, application-specific integrated circuit (ASIC), programmable logic array (PLA), complex programmable logic device (CPLD), or a field programmable gate array (FPGA).

The computer system 100 is configured to utilize one or more data storage units. The computer system 100 may include a volatile memory unit 106 (e.g., random access memory ("RAM"), static RAM, dynamic RAM, etc.) coupled with the address/data bus 102, wherein a volatile memory unit 106 is configured to store information and instructions for the processor 104. The computer system 100 further may include a non-volatile memory unit 108 (e.g., read-only memory ("ROM"), programmable ROM ("PROM"), erasable programmable ROM ("EPROM"), electrically erasable programmable ROM "EEPROM"), flash memory, etc.) coupled with the address/data bus 102, wherein the non-volatile memory unit 108 is configured to store static information and instructions for the processor 104. Alternatively, the computer system 100 may execute instructions retrieved from an online data storage unit such as in "Cloud" computing. In an aspect, the computer system 100 also may include one or more interfaces, such as an interface 110, coupled with the address/data bus 102. The one or more interfaces are configured to enable the computer system 100 to interface with other electronic devices and computer systems. The communication interfaces implemented by the one or more interfaces may include wireline (e.g., serial cables, modems, network adaptors, etc.) and/or wireless (e.g., wireless modems, wireless network adaptors, etc.) communication technology.

In one aspect, the computer system 100 may include an input device 112 coupled with the address/data bus 102, wherein the input device 112 is configured to communicate information and command selections to the processor 100. In accordance with one aspect, the input device 112 is an alphanumeric input device, such as a keyboard, that may include alphanumeric and/or function keys. Alternatively, the input device 112 may be an input device other than an alphanumeric input device. In an aspect, the computer system 100 may include a cursor control device 114 coupled with the address/data bus 102, wherein the cursor control device 114 is configured to communicate user input information and/or command selections to the processor 100. In an aspect, the cursor control device 114 is implemented using a device such as a mouse, a track-ball, a track-pad, an optical tracking device, or a touch screen. The foregoing notwithstanding, in an aspect, the cursor control device 114 is directed and/or activated via input from the input device 112, such as in response to the use of special keys and key sequence commands associated with the input device 112. In an alternative aspect, the cursor control device 114 is configured to be directed or guided by voice commands.

In an aspect, the computer system 100 further may include one or more optional computer usable data storage devices, such as a storage device 116, coupled with the address/data bus 102. The storage device 116 is configured to store information and/or computer executable instructions. In one aspect, the storage device 116 is a storage device such as a magnetic or optical disk drive (e.g., hard disk drive ("HDD"), floppy diskette, compact disk read only memory ("CD-ROM"), digital versatile disk ("DVD")). Pursuant to one aspect, a display device 118 is coupled with the address/data bus 102, wherein the display device 118 is configured to display video and/or graphics. In an aspect, the display device 118 may include a cathode ray tube ("CRT"), liquid crystal display ("LCD"), field emission display ("FED"), plasma display, or any other display device suitable for displaying video and/or graphic images and alphanumeric characters recognizable to a user.

The computer system 100 presented herein is an example computing environment in accordance with an aspect. However, the non-limiting example of the computer system 100 is not strictly limited to being a computer system. For example, an aspect provides that the computer system 100 represents a type of data processing analysis that may be used in accordance with various aspects described herein. Moreover, other computing systems may also be implemented. Indeed, the spirit and scope of the present technology is not limited to any single data processing environment. Thus, in an aspect, one or more operations of various aspects of the present technology are controlled or implemented using computer-executable instructions, such as program modules, being executed by a computer. In one implementation, such program modules include routines, programs, objects, components and/or data structures that are configured to perform particular tasks or implement particular abstract data types. In addition, an aspect provides that one or more aspects of the present technology are implemented by utilizing one or more distributed computing environments, such as where tasks are performed by remote processing devices that are linked through a communications network, or such as where various program modules are located in both local and remote computer-storage media including memory-storage devices.

Figure 2:
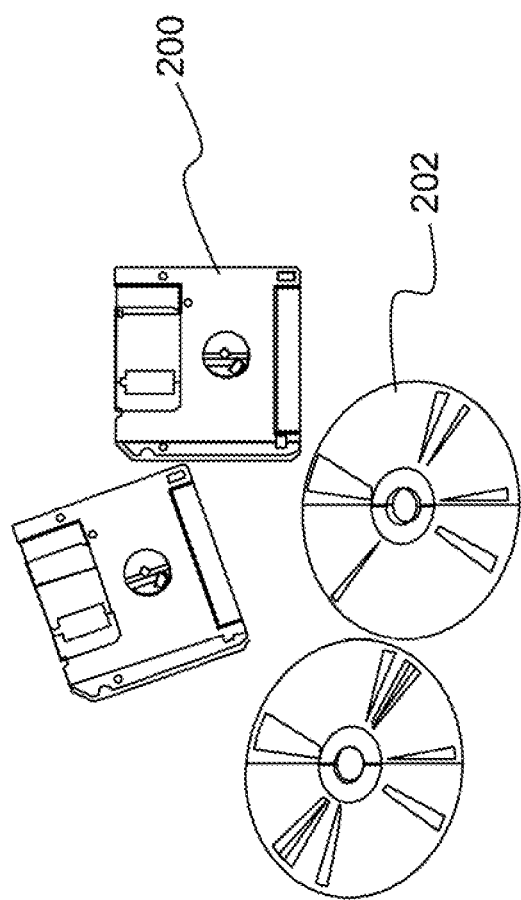
FIG. 2 is an illustration of a computer program product according to embodiments of the present disclosure.

An illustrative diagram of a computer program product (i.e., storage device) embodying the present invention is depicted in FIG. 2. The computer program product is depicted as floppy disk 200 or an optical disk 202 such as a CD or DVD. However, as mentioned previously, the computer program product generally represents computer-readable instructions stored on any compatible non-transitory computer-readable medium. The term "instructions" as used with respect to this invention generally indicates a set of operations to be performed on a computer, and may represent pieces of a whole program or individual, separable, software modules. Non-limiting examples of "instruction" include computer program code (source or object code) and "hard-coded" electronics (i.e. computer operations coded into a computer chip). The "instruction" is stored on any non-transitory computer-readable medium, such as in the memory of a computer or on a floppy disk, a CD-ROM, and a flash drive. In either event, the instructions are encoded on a non-transitory computer-readable medium.

(3) SPECIFIC DETAILS

Described is a system to obfuscate any Polynomial-size Ordered Binary Decision Diagram (POBDD) to protect sensitive information, which is hardcoded in POBDD form in the Random Oracle Model (ROM). The program can be correctly executed only a single time, and the secret information hidden in it is then revealed. Without correctly executing the program (i.e., having or computing the correct inputs that the program should be executed on), none of the information stored in it can be extracted. In cryptography, a random oracle is an oracle (a theoretical black box) that responds to every unique input/query with a truly random response chosen uniformly from its output domain. If a query is repeated, it responds the same way every time that query is submitted. In the ROM, a truly random source is assumed; such a source is typically instantiated with an implementation of an appropriate cryptographic hash function.

This developed obfuscation algorithm provides several security and efficiency guarantees. For instance, no computationally efficient adversary given the Obfuscated POBDD (OPOBDD) as its input can learn anything important about the original POBDD (e.g., the structure of the original POBDD), only the inputs and its corresponding outputs. Additionally, the program can be correctly executed only a single time, and the secret information hidden in it is then revealed. Without correctly executing the program (i.e., having or computing the correct inputs that the program should be executed on), none of the information stored in it can be extracted. Furthermore, the size of obfuscated POBDDs is larger than the size of original POBDDs by a security parameter (i.e., for 128 bit security, the security parameter is 128) times the length of inputs to the original POBDDs.

The obfuscation algorithm according to embodiments of the present disclosure provides a way to protect the important information of computer programs represented as circuits, which can be recognized by a POBDD. POBDDs are sufficiently expressive to compute, for example, the routing functions in network routers. More specifically, by Barrington's Theorem (see Literature Reference No. 2), there exists a POBDD of polynomial size with constant width that can compute a circuit of polynomial size and depth O(log (n)), which is essentially the complexity class of NC.

Other work in secure two-party computation, such as Yao's garbled circuit approach (see Literature Reference No. 9) and variations thereof, require interaction between the developer of the program/circuit to be executed and the one running it. In contrast, the system according to embodiments of the present disclosure allows one party to hand another party a program to be executed once if the correct inputs are known by the other party. If those inputs are not known by the second party, then nothing will be learned about the program. One can loosely think of this as a garbled circuit without interaction.

(3.1) Preliminaries

First, recall the definition of a polynomial-sized ordered binary decision diagram (POBDD). Let G be an ordered binary decision diagram (see Literature Reference No. 2). Then, G is defined as follows. Let $X_n$ be a set of n boolean variables $\{x_1, x_2, \ldots, x_n\}$ where the n boolean variables have a linear order. A POBDD over $X_n$ is a connected directed acyclic graph G of polynomial size in n with the following properties:

1. G has a root node (i.e., a node without incoming edges).
2. Nodes without outgoing edges (called sink nodes) are associated with values of either 0 or 1.
3. Every node other than the root and sink node is labeled by a variable in $X_n$.
4. Every boolean variable in $X_n$ appears at most once in every possible path from the root to a sink node.
5. Every node other than sink nodes has two outgoing edges labeled by either 0 or 1.
6. The order of nodes associated with boolean variables from the root to sink nodes is consistent with the order of boolean variables.
7. The number of nodes in G is polynomial in n.

As G is referred to as an ordered binary decision diagram, it is crucial to explicitly specify the order among the variables. Without loss of generality, it is assumed that $\{x_1, x_2, \ldots, x_n\}$ is already in order, and $x_1$ is always the root node of G for the simple exposition.

As described above, the obfuscation for POBDDs is achieved in the Random Oracle Model (ROM). In the ROM, all entities including an adversary, obfuscator, and obfuscated program are assumed to have an access to an ideal cipher, called the random oracle. For the practicality, this random oracle is instantiated as a cryptographic hash function in the description of obfuscation. The following table summarizes some notations used in the protocol description.

| | |
|---|---|
| G | A polynomial-size ordered binary decision diagram (POBDD) |
| V | A set of nodes in G |
| L | A set of terminal nodes in G |
| E | A set of edges in G |
| X | A set of ordered variables in G |
| u, v, $w_0$, $w_1$ | A parent node, current node and child nodes corresponding to outgoing edges with values 0 and 1 |
| $e_v(b)$ | An edge in E leaving node v, corresponding to bit b |
| H | A random oracle instantiated as a cryptographic hash function |

(3.2) Virtual Black-Box Obfuscation of POBDDs in the Random Oracle Model

Let $X_n = \{x_1, x_2, \ldots, x_n\}$ be a set of n boolean variables and let G be a POBDD over the set of variables $X_n$. That is, G is an acyclic graph with polynomially many nodes, where each node is labeled by one of the variables in $X_n$ as defined in Section (3.1). The obfuscation process comprises two components:

1. Obfuscation algorithm: Given a POBDD, an obfuscation algorithm transforms the input POBDD into a scrambled version of the POBDD (i.e., obfuscated POBDD) and outputs the scrambled version of the POBDD, preserving its functionality.
2. Evaluation algorithm: Given an obfuscated POBDD, an evaluation algorithm evaluates a queried input on the obfuscated POBDD.

(3.2.1) Obfuscation Algorithm

In the following, an algorithm is described, denoted by (Obfuscate), which takes a description of POBDD G as its input and outputs an obfuscated POBDD, denoted by O(G). Tree traversal is a form of graph traversal and refers to the process of visiting (i.e., checking and/or updating) each node in a tree data structure, exactly once. Such traversals are classified by the order in which the nodes are visited. The intuition behind the obfuscation according to embodiments of the present disclosure is that the evaluation of obfuscated POBDDs is viewed in the same way as the evaluation of POBDDs. That is, to evaluate a POBDD G on input $x = x_1 x_2 \ldots x_n$ in $\{0,1\}^n$, one must traverse nodes from the root to a leaf to obtain the output binary value, where each edge going out of nodes is determined by the input x. Each of the nodes and edges in the obfuscated POBDD O(G) are associated with secret values. To traverse the nodes in O(G), one is required to obtain the secret values associated with the nodes to traverse the secret values associated with the nodes by applying the random oracle model to two secret strings, where one is obtained as an encoding of input bit during the input query and another one is obtained by correct evaluation of the previous (or parent) node. The formal description of Obfuscate( ) is given in the following.

Let k be a security parameter. Let an input POBDD $G_n$ be described as sets $X_n$, E and V, sets of variables, edges, and nodes in $G_n$ respectively. In the rest, omit the subscription n from $G_n$ for convenience. The size of G is denoted by |G|, which is the number of nodes in V, so that each node can be associated by a unique identification (denoted by id) of $g = \log(|G|)$ bits. Since there are n variables and each node is associated with (labeled by) a variable, the description of G associates each node with a variable identification string (denoted by var) of $l = \log(n)+1$ bits. Therefore, each node is associated with a string var||id where || denotes a string concatenation, var is a l-bit string and id is a g-bit string. Let $H: \{0,1\}^* \rightarrow \{0,1\}^{3k+g+l}$ be a cryptographic hash function.

Algorithm Obfuscale (G'):

Input: Description of POBDD G' along with ordering of variables $X_n = (x_1, x_2, \ldots, x_n)$ Output: Obfuscated POBDD O(G)

Figure 3:
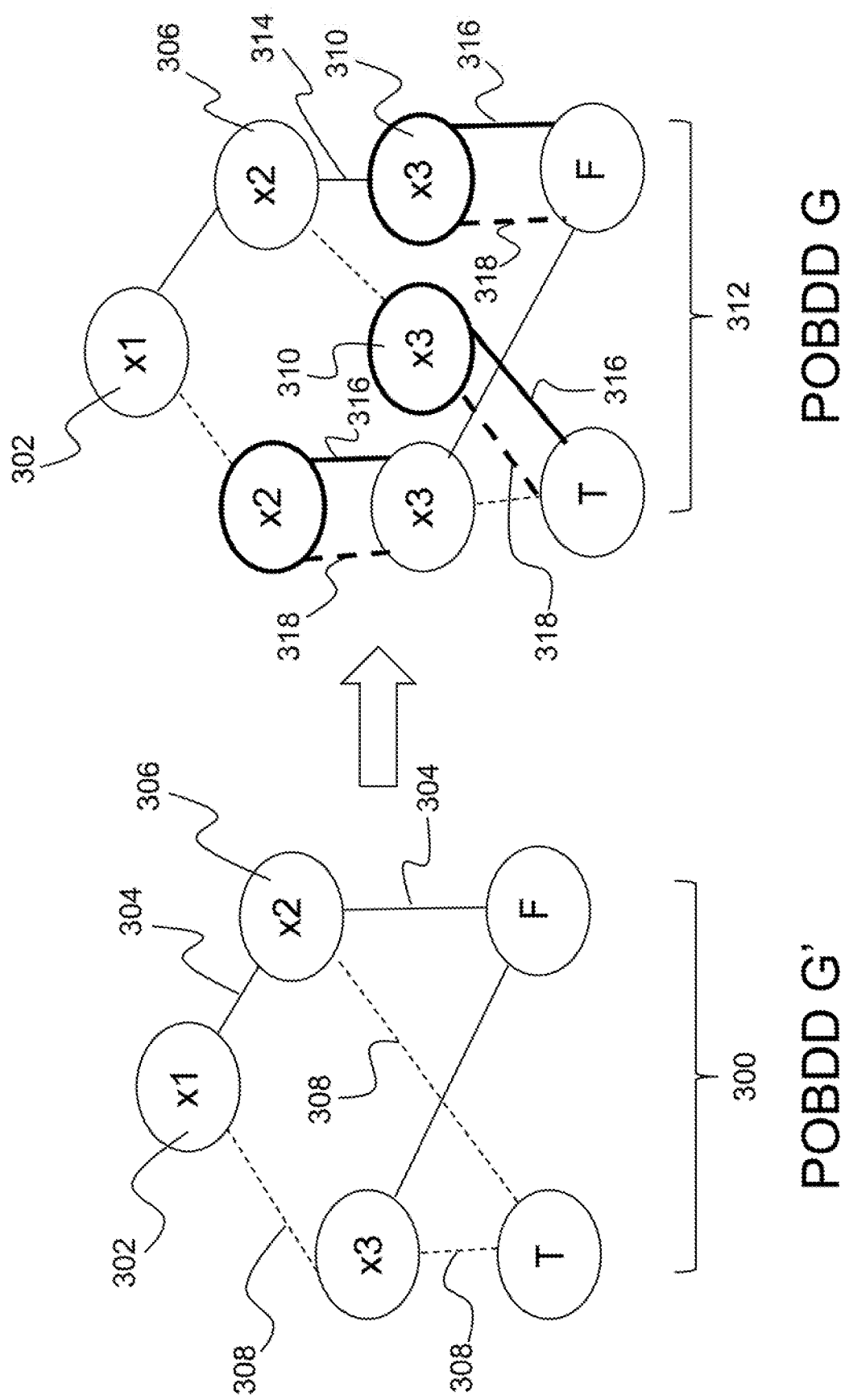
FIG. 3 is an illustration of obfuscating a POBDD according to embodiments of the present disclosure.

Step 1. Setting up G' for obfuscation (depicted in FIG. 3)
  a. Suppose that a POBBD G' (element 300) is given as (V, E'). Take G' (element 300) and do the following.
  b. Execute Breadth-First Search (BFS) (see Literature Reference No. 3) edge traversal from the root node (x1 node 302) to the leaves in V'. Breadth-first search (BFS) is an algorithm for traversing or searching tree or graph data structures. It starts at the root node (or some arbitrary node of a graph) and explores the neighbor nodes first, before moving to the next level neighbors.
  c. For each traversed edge from node u to v, denoted by e(u, v) in E', do the following:
    i. Check if u and v correspond to some variables $x_i$ and $x_{i+1}$ in $X_n$.
    ii. If so, proceed to the next BFS edge traversal (represented by solid lines 304, such as from x1 node 302 to x2 node 306).
    iii. Otherwise, find variables $x_i$ and $x_j \in X_n$ such that u and v correspond to $x_i$ and $x_j$ so that i+1<j. Then, remove edge e(u, v) from E' (represented by dashed lines 308), and add new nodes to V' between u and v as many as the number of intermediate missing variables between $x_i$ and $x_j$ (represented by, for example, additional x3 nodes 310 in POBDD G 312). Denote these new nodes by $W = (w_{i+1}, w_{i+2}, \ldots, w_{j-1})$, where each node in W corresponds to a missing variable between $x_i$ and $x_j$ and are consistent with the ordering of variables in $X_n$.
    iv. Add new edges as follows:
      1. Add edge $e(u, w_{i+1})$ to E' which has the identical edge value of e(u, v) (depicted as a new solid line 314 in POBDD G 312).
      2. For all adjacent nodes w and w' in W, add two edges e(w, w') to E, each with edge value either 0 or 1 (depicted as bold solid lines 316 and bold dashed lines 318).
      3. Add edge $e(w_{j-1}, v)$ to E' which has the identical edge value of e(u, v).
  d. Set G=G'=(E', V') where E' and V' are updated according to the above procedure.

Step 2. Setting up G for obfuscation
  a. For each node $v \in V \backslash L$, pick a random binary string $r_v$ of k bits.
  b. For each node $v \in V \backslash \{r\}$, pick a random binary string $s_v$ of k bits.
  c. For each edge $e \in E$, from u to v (i.e., u is a parent node of v) where $v \notin L$, form and assign to e, a string $m_e$ of k+l+g bits as $m_e = s_v || var_v || id_v$ where $s_v$ is the string assigned to v in Step 1-b, $var_v$ is the variable identifier of l bits, and $id_v$ is the unique node identifier of g bits.
  d. For each edge $e \in E$ from u to v where $v \in L$, form and assign to e, a string $m_e$ such that $m_e = 0 \ldots 0b || \perp || id_v$ where $0 \ldots 0b$ is a k-bit string with decision bit b, $\perp$ is a special identifier signifying that this is a terminal node, and $id_v$ is the unique node identifier of g bits Step 3. Obfuscation of G
  a. After Step 1, there is the following:
    i. Each node $v \in V \backslash L$ is assigned to random string $r_v$.
    ii. Each node $v \in V \backslash \{r\}$ is assigned to secret string $s_v$.
    iii. Each edge e from u to v is assigned to message string $m_e$.
  b. Obfuscating the root node (evaluation from the root node):
    For each edge e leaving the root u to a child node v. Note that there are only two edges leaving u, each corresponding to bit b=0 or 1. For convenience, denote $v_b$ to be the child node on the end of edge labeled with bit b leaving u. In addition, denote $m_b$ to be the message string assigned to the edge between u and $v_b$. Now, do the following: for each $b \in \{0, 1\}$,
    i. Compute hash $h = H(r_u, 0 \ldots 0 || 0 \ldots 0b || id_u)$ where $0 \ldots 0$ is a k-bit (empty) string, $0 \ldots 0b$ is a l-bit string with input b, and $id_u$ is the unique identifier for the root node.
    ii. Parse h into $h_1$ and $h_2$, where $h_1$ is the first 2k-bits and $h_2$ is the last k+l+g bits (i.e., $h = h_1 || h_2$).
    iii. Set $o_1 = h_1$ and $o_2 = m_b \oplus h_2$ where $\oplus$ denotes a bitwise XOR operation (see Literature Reference No. 8).
  c. Obfuscation of intermediate nodes:
    For each edge e leaving u to a child node v, repeat the following procedure in order from the top to the bottom of G: for each b $\{0, 1\}$,
    i. Compute hash $h = H(r_u, s_u || 0 \ldots 0b || id_u)$.
    ii. Parse h into $h_1$ and $h_2$, where $h_1$ is the first 2k-bits and $h_2$ is the last k+l+g bits.
    iii. Set $o_1 = h_1$ and $o_2 = m_b \oplus h_2$.

d. The obfuscation O(G) of input POBDD G is the collection of all pairs ($o_1$, $o_2$) generated in Step 2-b and Step 2-c along with the variable identifier and node identifier of the root and random strings $r_e$ for every node v in V\L.

(3.2.2) Evaluation Algorithm

Below is a description of how to evaluate G on input x by operating over O(G) prepared by Obfuscate(G).

Algorithm Evaluate(O(G), q):

Input: Obfuscated code O(G) and an input query q of k+l+g bits.

Output: Message m of k+l+g bits or ⊥.

Step 1. Compute h=H($r_v$, q), where $r_v$ is the random string of k bits for node v with the unique node identifier corresponding to id that is the last g bits of query q.

Step 2. Parse h into $h_1$ and $h_2$ where $h_1$ is the first 2k-bits and $h_2$ is the last k+l+g bits.

Step 3. If there exists ($o_1,o_2$) such that $h_1=o_1$, then outputs m=$h_2 \oplus o_2$. Otherwise, it outputs ⊥.

In the following, the process of evaluating G via evaluating O(G) on a n-bit input string x=$x_1 x_2 \ldots x_n$ is described. Assume that a client C wants to evaluate G on x given O(G). Recall that O(G) contains the variable identifier war for the root node v. Thus, C composes a query q=$r_v$, 0 . . . 0||0 . . . 0b||$id_v$, where b is an input bit corresponding to the value of $x_i$ such that i=var. C executes Evaluate(O(G), q) to obtain $m_w$=$s_w$||$var_w$||$id_w$. By parsing $m_w$, C obtains $s_w$, $var_w$, and $id_w$, which enables C to correctly compose a new query q= $s_w$||0 . . . 0b||$id_w$ and evaluate the next node by executing Evaluate(O(G), q). C repeats this process until the output message m is 0 . . . 0b||⊥||id, where ⊥ indicates that this is the terminal node and the decision bit is b.

Figure 4:
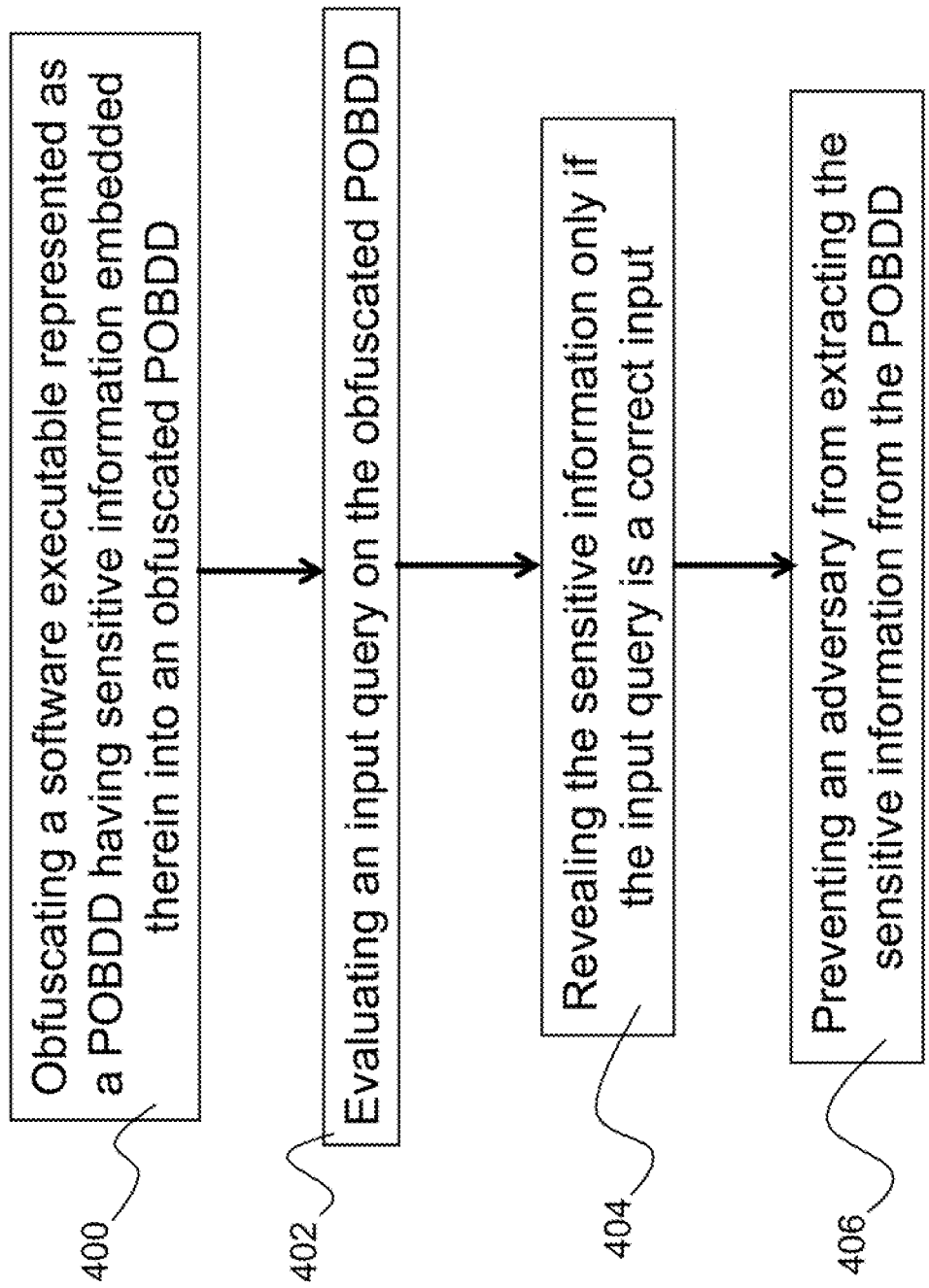
FIG. 4 is a flow diagram illustrating a process of obfuscating a POBDD to protect sensitive information embedded therein according to embodiments of the present disclosure.

FIG. 4 depicts the process flow according to some embodiments of the present invention. As described above, in a first operation 400, a software executable represented as a POBDD having sensitive information embedded therein is obfuscated into an obfuscated POBDD. In a second operation 402, an input query is evaluated on the obfuscated POBDD. The sensitive information is only revealed if the input query is a correct input (element 404). Thus, an adversary is prevented from extracting the sensitive information from the POBDD (element 406).

In summary, the described method transforms an unprotected (i.e., in the clear) decision making program/software into a completely protected one (i.e., obfuscated software, that is resistant to reverse engineering and analysis) that can be used as an unintelligible message containing decision program. Those decision programs are modeled by a tree graph of polynomial size, a binary decision diagram.

The present invention (called an obfuscator denoted by O) provides a way to transform a graph representation G describing a binary decision diagram into an obfuscated decision diagram O(G). The obfuscated decision diagram O(G) takes a sequence of secret strings corresponding to an input x. The output of obfuscated evaluation of O(G) is a single bit b (decision bit). Given O(G) without the secret information to evaluate, no efficient adversary can tell what the obfuscated decision diagram O(G) does except the length of the input string x to the decision diagram G. The obfuscated decision diagram O(G) can be used only one time. That is, if O(G) is evaluated with two distinct inputs x and x' (e.g., two distinct sequences of secret strings corresponding to x and x'), then the non-trivial information about G might be revealed.

The protocol described herein is very efficient. Essentially, the space complexity for obfuscated POBDD G' is O(|G|k)=O(|E'|nk)=O(|G'|nk). Time complexity of obfuscation is similarly dominated by O(|G'|n$T_H$) where $T_H$ is the running time of hash function H. Furthermore, the security of obfuscation described hides the mapping between the input string x and the corresponding output decision bit. That is, the best adversarial strategy to obtain decision bit b on input x is to actually query the obfuscated POBDDs on all nodes on a specific path from the root to leaves.

In particular, consider the following non-limiting example of application of the present invention. A remote computer system, such as a drone, is collecting binary data from the field. Given this collected data, the remote computer system needs to make a decision regarding the next action. Such instructions need to be protected even against adversaries which may obtain the software system on the remote computer system. Thus, even if a drone is captured by an adversary, the details of the drone's operation programmed in its system should not be revealed to the adversary. Such instructions can be pre-processed (i.e., obfuscated) with the system according to embodiments of the present disclosure before the remote computer system departs to the field and stored in the remote computer system. Upon the collection of field data, the remote system can obtain the secret information from the main server in order to evaluate the obfuscated instruction determining the next action.

The ability to obfuscate software executables will allow corporations to keep adversaries from discovering sensitive information embedded in their software, particularly in the case of software that contains significant algorithmic intellectual property. In addition, obfuscated software is more difficult to corrupt because only the input/output behavior is known, preventing an adversary from further probing. While the invention described herein provides protection if the program is not run, it is a stepping stone to a complete solution and can be used as a sub-module or building block for a more comprehensive obfuscation solution.

Finally, while this invention has been described in terms of several embodiments, one of ordinary skill in the art will readily recognize that the invention may have other applications in other environments. It should be noted that many embodiments and implementations are possible. Further, the following claims are in no way intended to limit the scope of the present invention to the specific embodiments described above. In addition, any recitation of "means for" is intended to evoke a means-plus-function reading of an element and a claim, whereas, any elements that do not specifically use the recitation "means for", are not intended to be read as means-plus-function elements, even if the claim otherwise includes the word "means". Further, while particular method steps have been recited in a particular order, the method steps may occur in any desired order and fall within the scope of the present invention.

What is claimed is:

1. A system for protecting sensitive information, the system comprising:

one or more processors and a non-transitory memory having instructions encoded thereon such that when the instructions are executed, the one or more processors perform operations of:

transforming a software executable readable code represented as a polynomial-size ordered binary decision diagram (POBDD) having sensitive information embedded therein into an obfuscated code that is hard-coded in POBDD form, wherein transforming the software executable readable code comprises a cryptographic obfuscation process that hides a mapping between an input query and a corresponding output decision bit, wherein the cryptographic obfuscation process guarantees protection of the sensitive information;

evaluating the input query on the obfuscated code via an evaluation process; and revealing the sensitive information embedded in the software executable readable code only if the input query is a correct input, wherein the input query is a sequence of secret strings, having a length, corresponding to an input x, and wherein an output of the evaluation process is the output decision bit providing an instruction regarding a next operation to perform.

2. The system as set forth in claim 1, wherein the one or more processors further perform operations of:

generating an output message string in response to a first input query by a party;

parsing the message string, wherein a result from parsing the message string allows the party to correctly compose a new input query and evaluate a next node in the obfuscated code; and executing the evaluation process until an output message string indicates a terminal node in the obfuscated code or an output decision bit.

3. The system as set forth in claim 1, wherein the one or more processors further perform an operation of restricting access to the sensitive information when an incorrect input query is received while permitting adversaries to determine the length of the sequence of secret strings.

4. The system as set forth in claim 1, wherein the cryptographic obfuscation process takes as input a set of ordered variables, a set of edges, and a set of nodes describing the software executable readable code, and outputs the obfuscated code.

5. The system as set forth in claim 4, wherein for each edge leaving a root node to a child node, the one or more processors further perform an operation of computing a cryptographic hash function, resulting in a variable identifier and a unique node identifier of the root node and random strings for every child node.

6. The system as set forth in claim 1, wherein the obfuscated code in POBDD form comprises a plurality of nodes and edges, and wherein each node and edge is associated with a secret value related to an input bit of the input query via a cryptographic hash function, such that to traverse the nodes, the secret values associated with the nodes must be obtained.

7. The system as set forth in claim 1, wherein the obfuscated code can be correctly evaluated only once.

8. A computer-implemented method for protecting sensitive information, comprising:

an act of causing one or more processors to execute instructions stored on a non-transitory memory such that upon execution, the one or more processors perform operations of:

transforming a software executable readable code represented as a polynomial-size ordered binary decision diagram (POBDD) having sensitive information embedded therein into an obfuscated code that is hardcoded in POBDD form, wherein transforming the software executable readable code comprises a cryptographic obfuscation process that hides a mapping between an input query and a corresponding output decision bit, wherein the cryptographic obfuscation process guarantees protection of the sensitive information;

evaluating the input query on the obfuscated code via an evaluation process; and revealing the sensitive information embedded in the software executable readable code only if the input query is a correct input, wherein the input query is a sequence of secret strings, having a length, corresponding to an input x, and wherein an output of the evaluation process is the output decision bit providing an instruction regarding a next operation to perform.

9. The method as set forth in claim 8, wherein the one or more processors further perform operations of:

generating an output message string in response to a first input query by a party;

parsing the message string, wherein a result from parsing the message string allows the party to correctly compose a new input query and evaluate a next node in the obfuscated code; and executing the evaluation process until an output message string indicates a terminal node in the obfuscated code or an output decision bit.

10. The method as set forth in claim 8, wherein the one or more processors further perform an operation of restricting access to the sensitive information when an incorrect input query is received while permitting adversaries to determine the length of the sequence of secret strings.

11. The method as set forth in claim 8, wherein the cryptographic obfuscation process takes as input a set of ordered variables, a set of edges, and a set of nodes describing the software executable readable code, and outputs the obfuscated code.

12. The method as set forth in claim 11, wherein for each edge leaving a root node to a child node, the one or more processors further perform an operation of computing a cryptographic hash function, resulting in a variable identifier and a unique node identifier of the root node and random strings for every child node.

13. The method as set forth in claim 8, wherein the obfuscated code in POBDD form comprises a plurality of nodes and edges, and wherein each node and edge is associated with a secret value related to an input bit of the input query via a cryptographic hash function, such that to traverse the nodes, the secret values associated with the nodes must be obtained.

14. The method as set forth in claim 8, wherein the obfuscated code can be correctly evaluated only once.

15. A computer program product for protecting sensitive information that is hardcoded in polynomial-size ordered binary decision diagram (POBDD) form, the computer program product embodied on a non-transitory computer-readable medium having computer-readable instructions stored thereon, the computer-readable instructions executable by a computer having one or more processors for causing the processor to perform operations of:

transforming a software executable readable code represented as a polynomial-size ordered binary decision diagram (POBDD) having sensitive information embedded therein into an obfuscated code that is hardcoded in POBDD form, wherein transforming the software executable readable code comprises a cryptographic obfuscation process that hides a mapping between an input query and a corresponding output decision bit, wherein the cryptographic obfuscation process guarantees protection of the sensitive information;

evaluating the input query on the obfuscated code via an evaluation process; and revealing the sensitive information embedded in the software executable readable code only if the input query is a correct input, wherein the input query is a sequence of secret strings, having a length, corresponding to an input x, and wherein an output of the evaluation process is the output decision bit providing an instruction regarding a next operation to perform.

16. The computer program product as set forth in claim 15, further comprising instructions for causing the one or more processors to perform operations of:

generating an output message string in response to a first input query by a party;

parsing the message string, wherein a result from parsing the message string allows the party to correctly compose a new input query and evaluate a next node in the obfuscated code; and executing the evaluation process until an output message string indicates a terminal node in the obfuscated code or an output decision bit.

17. The computer program product as set forth in claim 15, further comprising instructions for causing the one or more processors to perform an operation of restricting access to the sensitive information when an incorrect input query is received while permitting adversaries to determine the length of the sequence of secret strings.

18. The computer program product as set forth in claim 15, wherein the cryptographic obfuscation process takes as input a set of ordered variables, a set of edges, and a set of nodes describing the software executable readable code, and outputs the obfuscated code.

19. The computer program product as set forth in claim 18, wherein for each edge leaving a root node to a child node, the one or more processors further perform an operation of computing a cryptographic hash function, resulting in a variable identifier and a unique node identifier of the root node and random strings for every child node.

20. The computer program product as set forth in claim 15, wherein the obfuscated code in POBDD form comprises a plurality of nodes and edges, and wherein each node and edge is associated with a secret value related to an input bit of the input query via a cryptographic hash function, such that to traverse the nodes, the secret values associated with the nodes must be obtained.

\* \* \* \* \*